March 4, 1930. N. J. CONRAD Re. 17,611
SWITCH
Original Filed Dec. 12, 1925 8 Sheets-Sheet 1
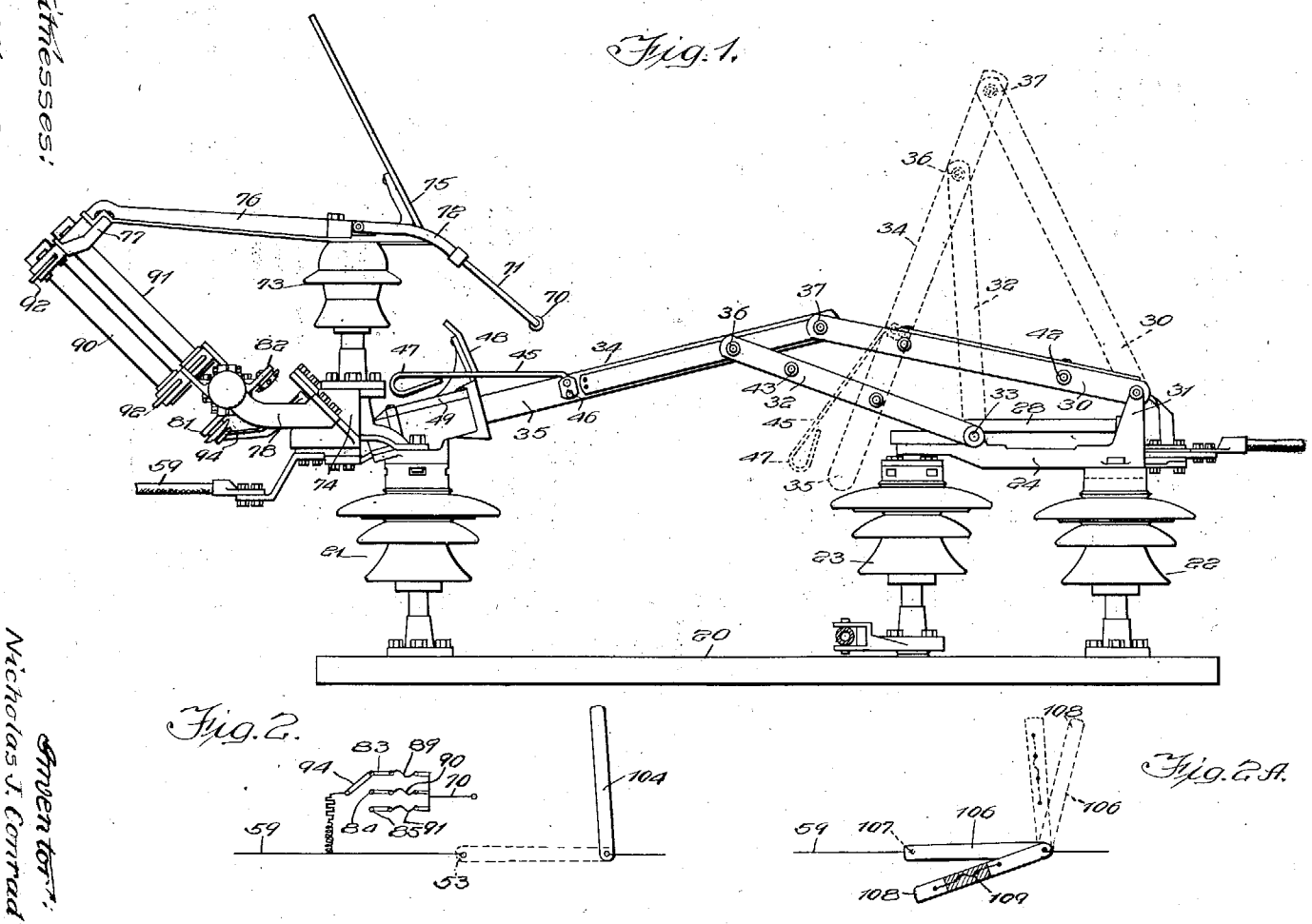
Witnesses:
William R. Kilroy
Harry R. L. White
Inventor:
Nicholas J. Conrad
By Brown Boulcher Denner
Attys.

March 4, 1930. N. J. CONRAD Re. 17,611

SWITCH

Original Filed Dec. 12, 1925 8 Sheets-Sheet 2

Witnesses:
William L. Kilroy
Nancy R. L. White

Inventor:
Nicholas J. Conrad
By Brown, Boettcher, Dienner
Attys

March 4, 1930. N. J. CONRAD Re. 17,611
SWITCH
Original Filed Dec. 12, 1925 8 Sheets-Sheet 3
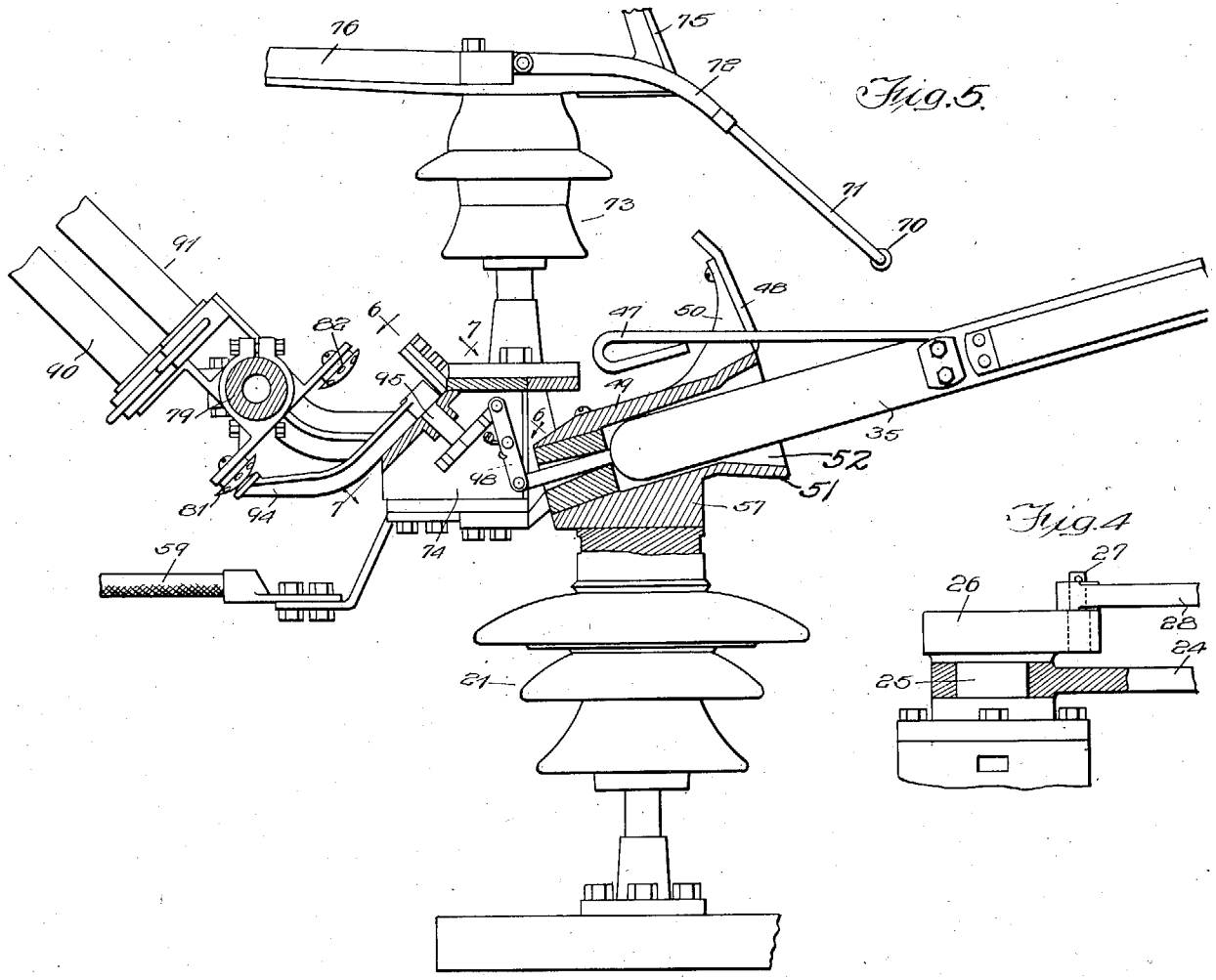
Witnesses:
William P. Kilroy
Harry R. LWhite
Inventor:
Nicholas J. Conrad
By Brown Boettcher & Dennis
Attys March 4, 1930. N. J. CONRAD Re. 17,611

SWITCH

Original Filed Dec. 12, 1925 8 Sheets-Sheet 4

Witnesses:
William R. Kilroy
Harry R. L. White

Inventor:
Nicholas J. Conrad
By Brown, Bottum & Dienner
Attys

March 4, 1930. N. J. CONRAD Re. 17,611
SWITCH.
Original Filed Dec. 12, 1925 8 Sheets-Sheet 5
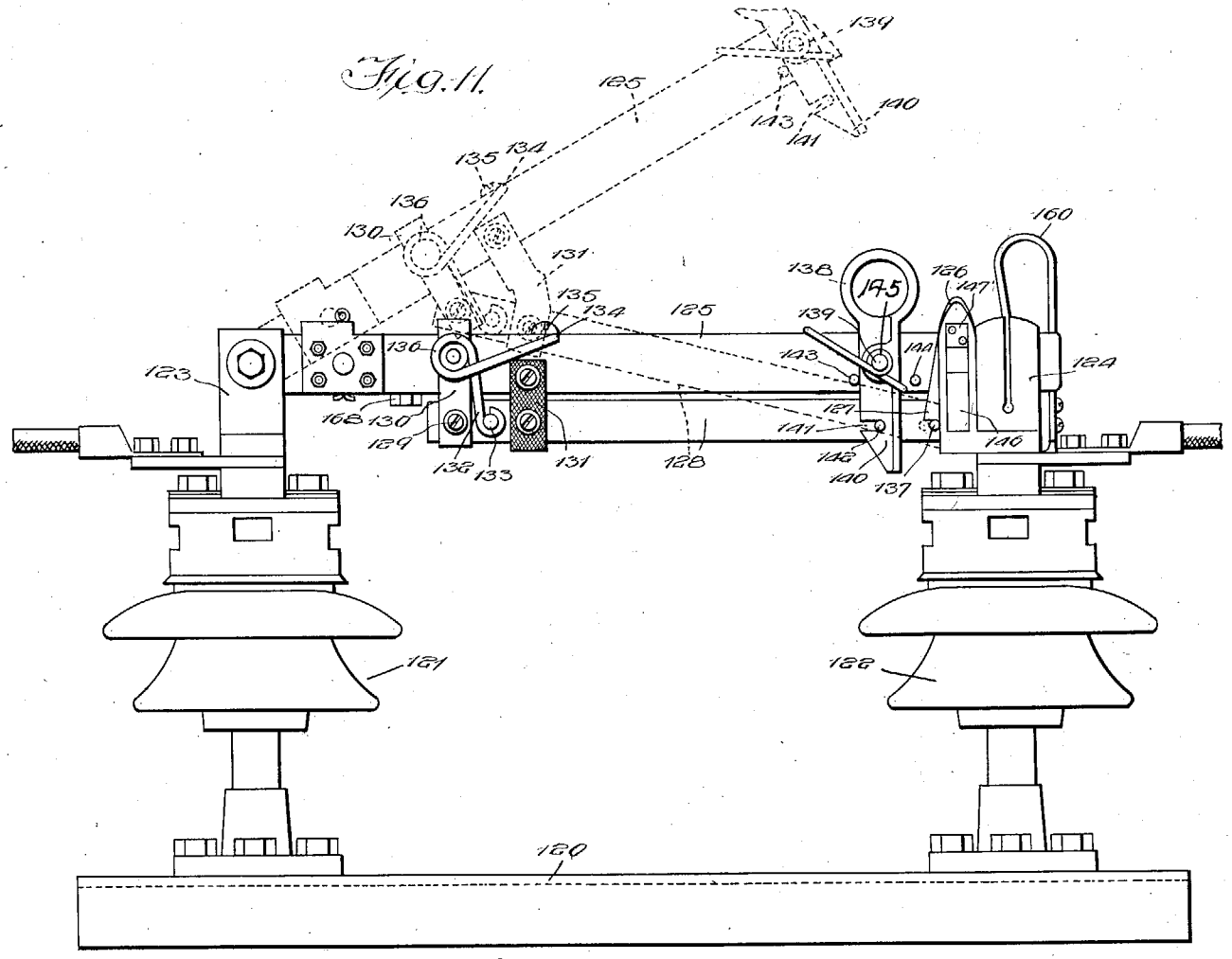
Witnesses:
William R. Kilroy
Harry R. L. White
Inventor:
Nicholas J. Conrad
By Brown Berlicher & Kenner
Attys.

March 4, 1930. N. J. CONRAD Re. 17,611

SWITCH

Original Filed Dec. 12, 1925 8 Sheets-Sheet 6

Witnesses:

William P. Kilroy

Harry R. Lewis

Inventor:

Nicholas J. Conrad

By Brown Boettcher & Dienner

Attys.

March 4, 1930. N. J. CONRAD Re. 17,611

SWITCH

Original Filed Dec. 12, 1925 8 Sheets-Sheet 7

Witnesses:
William R. Kilroy
Harry R. L. White

Inventor:
Nicholas J. Conrad
By Brown Berlinger & Denner
Attys

March 4, 1930.

N. J. CONRAD

SWITCH

Re. 17,611

Original Filed Dec. 12, 1925 8 Sheets-Sheet 8

Witnesses:

William R. Kilroy

Harry E. White

Inventor:

Nicholas J. Conrad

By Brown Berlinger & Simmons

Attys

Reissued Mar. 4, 1930

Re. 17,611

UNITED STATES PATENT OFFICE

NICHOLAS J. CONRAD, OF WINNETKA, ILLINOIS, ASSIGNOR TO SCHWEITZER & CONRAD, OF CHICAGO, ILLINOIS, A CORPORATION OF ILLINOIS

SWITCH

Original No. 1,631,012, dated May 31, 1927, Serial No. 74,930, filed December 12, 1925. Application for reissue filed April 29, 1929. Serial No. 359,139.

My invention relates to switches, and more particularly of the class which is employed for interrupting current flow in open air. While the particular embodiment which I have elected to illustrate herein is an air break switch, it is to be understood that the invention is not limited to air break switches but may be employed for breaking the circuit in other media than air.

Consider an alternating current arc drawn between a stationary electrode and a moving electrode. Twice each cycle the current in this arc has an instantaneous value of zero and during this instant the gas in the gap between the electrodes becomes partially deionized. A short instant later the voltage has a finite and increasing value in accordance with the usual sine law. If the rate of deionization is so great that the voltage across the contact does not reach a value sufficient to break down the gap, the arc goes out, otherwise the arc will continue for another half cycle when the process will be repeated. It has been shown that in air deionization to an extent necessary to withstand the first few hundred volts is recovered almost instantly but later increments of dielectric strength are recovered at a much slower rate. The rate of deionization is determined by a large number of factors of which may be mentioned the size and shape of the electrodes, the distance between the electrodes, and the temperature and pressure of the region at the gap, and by controlling any of these factors the rate of deionization may be increased.

It is one of the objects of the present invention to provide a high voltage switch wherein the main contacts are separated in air and the current flow through the circuit is then interrupted at a point other than the main contact, provision being made to extinguish the arc more quickly and conveniently than it would be extinguished if the separation of the main contacts were relied upon to extinguish it. The switch is provided with arcing contacts so that upon opening the main contacts an arc is drawn between the arcing contacts and when these contacts have been separated by such an amount that the dielectric strength of the air gap is sufficient to withstand the voltage of the line, the current flow between those contacts is diverted through another path having high arc extinguishing properties.

One of the features of improvement in the present invention is the employment of an electric fuse preferably of high current interrupting capacity as a means for suppressing the arc that would otherwise be formed at the main switch contacts by separation of such contacts.

I am aware that a fuse of this character has been employed in a similar situation for suppressing the arc which would otherwise be drawn at the main switch contacts, as shown, for example, in the patent to Schweitzer, No. 1,211,967, of January 9, 1917, in which the main contacts of the switch are shunted by a fuse of high current interrupting capacity either at the instant when the contacts are separated or shortly thereafter, as shown in said patent.

According to the present invention, the switching contacts are separated by a motion which first tends to draw an arc between them and which thereafter shunts the arc with the fuse for a period sufficient to establish a circuit through the fuse and to suppress the arc at the main contacts, and then the main contacts continue their separating movement to include a further break between them and between one of those contacts and the fuse contact or terminal.

The spacing of the auxiliary fuse contact may be suitably controlled and the inductance and resistance of the fuse circuit may be so proportioned as to secure a suitable sequence of operations.

This idea may be embodied in a variety of different forms and I have shown two forms, one in which there are a stationary contact and a movable switch contact with an adjacent stationary fuse contact. The movable switch contact leaves the stationary switch contact and in its path of movement to separate the two, it makes temporary contact with the fuse contact and then continues its movement. In another embodiment which I have shown, there are a stationary switch contact and a movable switch contact and a movable fuse contact. The movable switch contact leaves the stationary switch contact, throwing the fuse into the circuit across the arc and then the fuse contact is moved to separate the fuse contact from the stationary switch contact, the movable switch contact continuing its opening movement.

The same idea is contained in each, the difference being in the parts which move relative to each other.

Incidentally, I have provided in the two main embodiments which I have mentioned, certain other improvements, one of which is the use of a magazine or fuses for permitting of a plurality of operations of the switch without renewal of the fuses. I have also shown in the second embodiment certain improvements in switches relating to the locking means therefor, the quick break mechanism therefor, the contact mechanism therefor, and other features which will be apparent from the detailed description.

Now, in order to acquaint those skilled in the art with the manner of constructing and operating a device embodying my invention, I shall described in connection with the accompanying drawings two specific embodiments of the invention.

In the drawings,

Fig. 1 is a side elevational view of a switch embodying my present invention;

Fig. 2 is a diagram of connections and mode of operation of the same;

Fig. 2A is a diagram of connections and mode of operation of a modified form of switch;

Fig. 4 is a fragmentary elevational view partly in section, showing the operating crank for moving the movable switch contact;

Fig. 5 is a side elevational view partly in section, showing the operating mechanism for changing the fuses in the magazine for successive operations of the switch;

Fig. 11 is a side elevational view of a modified form of switch;

Figure 3:
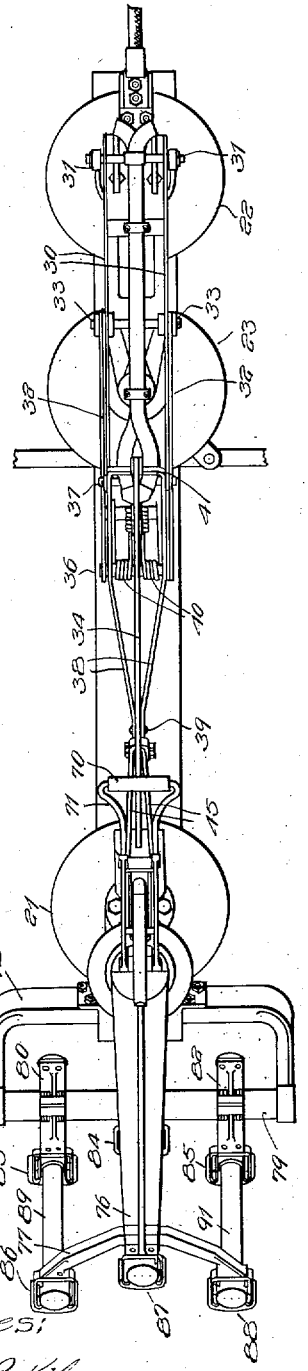
Fig. 3 is a top plan view of the switch shown in Fig. 1.
Figure 10:
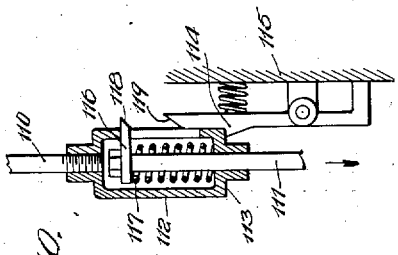
Fig. 10 is a fragmentary view showing the quick throw spring connection in the operating rod for operating one or more of the switches of this character.
Figure 9:
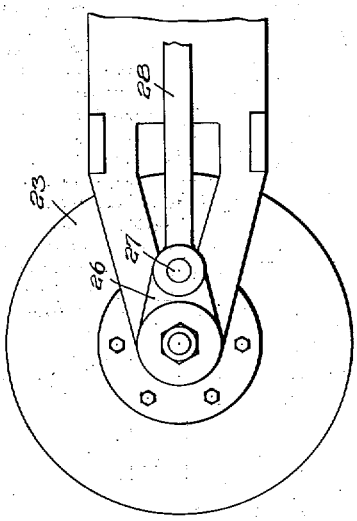
Fig. 9 is a top plan view of the operating crank shown in Fig. 4.

Referring now to the form of switch shown in Figs. 1 to 10, inclusive, a base member 20 provides a support for two stationary insulators 21 and 22 and a rotating or oscillating insulator 23 adapted to be rocked on its own vertical shaft. A bridge bar or frame 24 is connected to the top of the insulator 22, being rigidly secured thereto, and is connected to the top of insulator 23 by a suitable journal bearing 25, shown in Fig. 4, which connects the top of the rocking insulator 23 with the crank disc 26 bearing crank pin 27. This crank pin 27 is connected to a pitman or connecting rod 28, which in turn is connected by a suitable bracket arm to each of the side links 30 which are pivoted upon the pivot bearing arms 31. These arms or brackets are formed as an integral part of the frame 24. A second pair of links 32, 32 is pivoted on the bearings 33, 33, which bearings are also formed on the frame member 24. The links 32 are shorter than the links 30. Both sets of links 30 and 32 are pivoted at their forward ends of the switch arm 34, the outer end of which comprises a blade or contact portion 35. This blade or contact portion 35 runs back to the pivots 36 and 37, there being side braces 38, 38 secured at their forward ends, as indicated at 39, to the main blade member 35, and connected at their rear ends to the pivots 36 and 37 with suitable counter balancing springs 40 mounted on the pivot rod 36 tending to throw the switch into the dotted line position, as shown in Fig. 1.

The side braces 38 are connected at their ends to the central bar 34 by brackets 41, so that the switch is braced laterally. The pairs of links 30 and 32 are connected together by a post, as indicated at 42 and 43, to brace the operating mechanism of the switch. It will now be seen that the stationary frame 24, the links 30 and 32, and the connected arm 34, comprise a means consisting of four members pivotally connected to each other in a closed figure, for moving the switch contact 35 by a plunging motion from the open position as shown in dotted lines in Fig. 1, to the closed position as shown in full lines.

The movable switch arm 34 carries a pair of arcing fingers 45, 45 anchored at their ends by clamps 46 to the switch bar 34 and having their free ends formed into loops, as indicated at 47 in Fig. 1, these arcing fingers lying upon opposite sides of a stationary arcing finger 48 mounted upon the top plate 49 through the medium of an integral bracket 50. These arcing fingers 45 are preferably steel rods which lie upon opposite sides of the stationary arcing finger 48.

The stationary contact is mounted in a housing 51 having a flared guiding opening 52 for guiding the movable contact member 35 into engagement with the jaws 53, 53. These jaws 53, 53 are connected by flexible braided conductors 54, 54 to the terminal block 55, this terminal block 55 having a pair of supporting ears 56, 56 by which it is mounted upon the base 57 of the housing 51. The terminal block 55 also has a rearwardly extending lug or bolting terminal 58 which may be connected directly or indirectly with the series conductor 59, as shown in Fig. 5. The contact clip 53 is connected to the flexible conductor 54 by means of a stud 60 which is secured in this contact member 53 and passes through the flexible conductor 54. A clamping nut 61 is threaded on the stud 60 and it draws the flexible conductor 54 against the contact 53. At its outer end where the contact member 53 is flared, the flexible conductor 54 is connected to the clip by means of the machine screw 62. The stud 60 serves in addition to clamping the flexible conductor 54 to the contact 53, the purpose of guiding the contact 53 upon the outer end of the spring 63. The spring 63 passes loosely over the end of the stud 60 and then has a cotter pin 64 extending through the end of the stud to keep the spring in place.

In order to guide the contact clip 53 in line with the spring 63, I provide studs 65 which are secured in the contact clip 53 and extend through the flexible conductor 54 loosely through holes in the spring 63 to guide the contact clip 53 and yet to permit sufficient free motion of the clip 53 to permit it to adjust itself to the face of the contact 35 forming the end of the switch blade.

Figure 8:
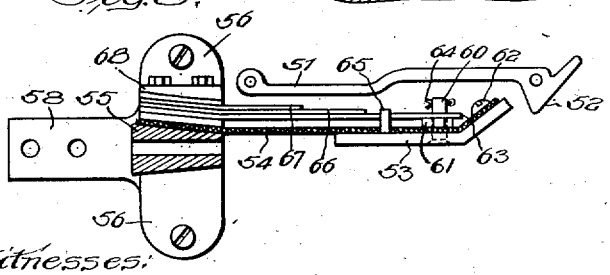
Fig. 8 is a plan view of the stationary switch contact showing one of the movable jaws for embracing the end of the switch blade, and associated parts.

The spring 63 is secured at its rear end to the terminal post 55, the spring thereby serving as a cantilever spring. The spring may be made up of several leaves of different lengths, as for example, the additional leaves 66 and 67, as shown in Fig. 8, all having their rear ends clamped under the clip 68 and secured to the post or terminal 55.

The two sides of the contact device are symmetrical and instead of employing a single set of springs on each side, the springs may be double on each side, that is, arranged one above the other.

The operation of the switch thus far described will be apparent. When the movable insulator 23 is rotated on its journal 25 in the bracket 24, the crank pin 27 being eccentric to said journal, it moves the connecting rod 28 longitudinally of the switch and, as shown in Fig. 1, moves the rod 28 to the left turning the link 30 about its pivot on the bracket 31 and compelling movement of the links 32 and 34, whereby the movable contact 35 is withdrawn from the contact clips 53 through a motion which terminates the position of these parts, as shown in dotted lines in Fig. 1. The arcing fingers 47 leave the arcing contact 48 after the main contact 35 has left the contact clips 53, so that any arc which may be drawn by the switch in opening will be sustained by the auxiliary non-current carrying contact instead of the main contacts 35, 53.

So far the operation of the switch is no different from the operation of other switches of this class with respect to the interruption of current flow.

I have provided an auxiliary contact 70 which lies in the path of the arcing contacts 47 after they leave the stationary contacts 48, and so disposed with respect to the travel of the main contact that after the main contacts are open and an arc is drawn at the contacts 47, 48, further movement of the switch towards its fully open position will bring the auxiliary contacts 47 into engagement with the auxiliary contact 70, this auxiliary contact 70 being so spaced that further opening movement of the switch will not tend to permit re-establishment of an arc at the main stationary contacts 53, 48. Preferably, the auxiliary contact 70 comprises a short tubular section of metal mounted upon an iron rod 71, the ends of which are secured to a suitable bracket member 72 mounted upon an insulator 73, the base of which is supported upon a bracket 74 mounted on top of the main stationary insulator 21. The frame or bracket 72 is open at its center to receive the arcing contact or horn member 75, which extends diagonally upwardly from the bracket 72 for the purpose of forming a horn gap interrupter in case of failure of the switch to function in normal operation.

The bracket 72 is connected in turn to a rearwardly extending frame member 76 which supports the fuse magazine frame 77 at its rear end. The bracket member 74, which is mounted upon the stationary insulator 21, supports a frame member 78 which is in the shape of a U. Across the terminals of the U there is connected a bar 79 of insulating material, and upon this bar of insulating material there are clamped the contact members 80, 81 and 82, the contact members in turn being connected to fuse clips 83, 84 and 85, respectively. The fuse frame 77 also has fuse clips 86, 87 and 88 corresponding to the fuse clips 83, 84 and 85 at the lower end, and between these pairs of fuse clips I mount the enclosed carbon tetrachloride fuses now well known in the market. Any other equivalent fuse, or fuse of high interrupting capacity, might be employed instead. These fuses are preferably of the type disclosed in my co-pending application, Serial No. 631,263 filed April 11, 1923. These fuses are mounted in fuse clips of the type also disclosed in said co-pending application. These fuse clips are characterized by the employment of wire bails 92 which serve to compress the spring blades against the sides of the ferrules of the fuses and to hold the fuses against accidental removal from the fuse clips. The fuses which I have described have caps which may be blown from the end thereof and such ends are the upper ends of the fuses, and in this case the fuses are directed upwardly and to the rear of the switch so that severe blowing of any one of the fuses will not affect the operation of the switch, and the discharge of gases or vapors from such fuses will not affect the main arcing space of the switch.

It will be observed that the upper terminals of the fuses 89, 90 and 91 are all connected to the auxiliary fuse contact 70, and at the lower ends the fuses are all connected to separate contacts 83, 84 and 85. These contacts are selected by a selector arm 94, the selector arm 94 being secured on a shaft 95 in the bracket member 74 which is hollow, and which serves in addition to its function of supporting the insulator 73 and the U shaped frame member 78, as a housing for the pawl and ratchet mechanism for shifting the selector arm 94.

The shaft 95 has a ratchet wheel 96 secured upon the inner end thereof and this ratchet wheel 96 is adapted to be engaged by an operating pawl 97, which operating pawl is mounted upon the rocking lever 98. The lever 98 in turn is pivoted to the push rod 99, which push rod is guided through the terminal or clamping lug 55 of the stationary contact mechanism. The push rod 99 is adapted to be engaged by the end of the contact 35 when the switch is closed for shifting the selector arm 94 from one of the fuse contacts to another fuse contact through the operation of the pawl and ratchet mechanism. The pawl 97 is guided in a suitable guideway 100, shown in Figs. 6 and 7, and is urged into contact with the ratchet wheel 96 by means of the spring 101. The ratchet wheel 96 is held against return motion by the spring pressed detent 102, which is adapted to offer a predetermined degree of resistance to backward motion of the ratchet wheel 96 but to yield under excessive pressure to permit the selector arm 94 to be returned to its initial or inoperative position out of contact with members 80, 81 and 82, shown in dotted lines in Fig. 6. The function of the spring pressed detent 102 is to prevent normal retrograde motion of the ratchet wheel 96 under the action of the pawl 97 when it returns to catch the next tooth. However, when it is desired to reset the mechanism by providing fresh fuses, the arm 94 must be moved back to the initial position and the yielding character of the pawl 102 permits of this action by forcibly pulling the selector arm 94 from its advanced position to its initial position.

The operation of the mechanism thus far described is as follows:—

Figure 6:
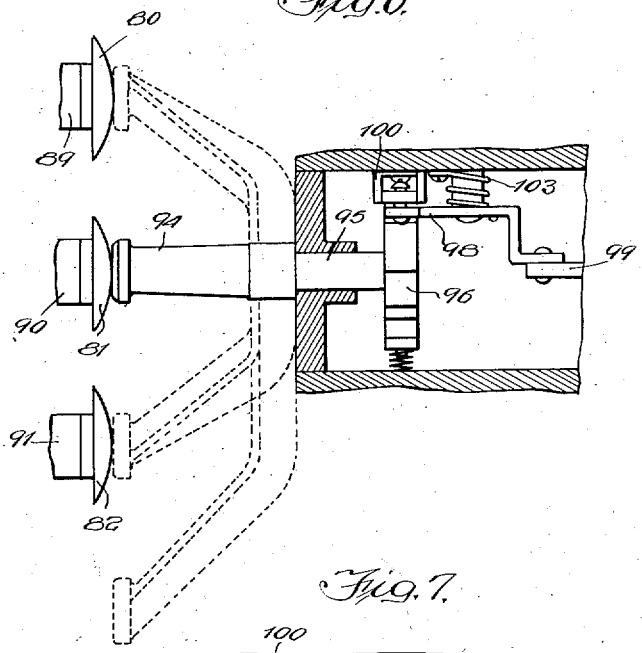
Fig. 6 is a fragmentary sectional view taken on the line 6—6 of Fig. 5, showing the means for moving the selector contact of the fuse magazine.
Figure 7:
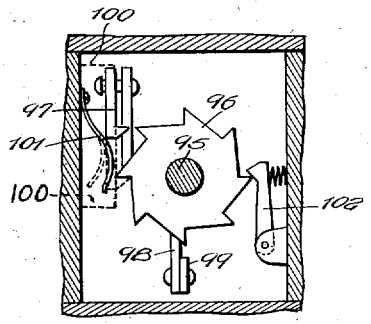
Fig. 7 is a similar fragmentary section taken on the line 7—7 of Fig. 5.

Assuming that the selector arm 94 is in its initial position, as indicated by the lowermost dotted line position in Fig. 6, the rocking insulator 23 is operated to swing its eccentric so as to plunge the movable contact member 35 forward into engagement with the stationary contact 53. The two divergent arcing fingers 47 are guided upon the stationary arcing contact 48, so as to assist in guiding the contact 35 into place between the contact clips 53. As the switch is closed, the arcing fingers 47 may engage the contact 70, but since the selector arm 94 is in initial position where none of the fuses are in circuit, the fuse will not be operated and the switch will be closed normally. As the movable contact 35 is brought into position, it operates the push rod 99 and moves the swinging lever 98 to operate the pawl 97 to pull the ratchet wheel 96 one step forward. It is to be noted that the swinging lever 98 is normally urged by a spring 103 into advanced position, so that when the movable switch contact 35 plunges between the contact 53 the pawl 97, being in engagement with a tooth of the ratchet wheel, is able to advance the same one step to bring the selector arm 94 from one position to the next position. As the switch is thus closed the selector arm 94 is brought from the zero or initial position to the first position for including the first fuse 91 into circuit. Thereafter, assume that the switch is to be opened to interrupt the flow of current. The rocking insulator 23 is actuated to pull up on the connecting rod 28. It is to be observed that when the switch is closed the crank arm and connection rod 28 form a toggle which is then substantially straight so as to prevent accidental blowing open of the switch by its own magnetic forces.

As the switch moves to open position the contact is first interrupted at the main contact, then at the arcing contacts 48, 47, and thereafter the arcing contacts 47 engage the auxiliary contact 70, which is connected to one of the fuses after the switch has so far opened that there is no reestablishment of the arc at either the contact 35 or 48.

It is preferable that some means be provided for insuring a continued rapid motion of the movable elements of the switch after a starting operation is initiated. This is to insure that after the arcing contacts 47 have been brought into engagement with the auxiliary contact 70, that further motion of the switch will be rapid and uninterrupted, so that there will be no tendency to re-establish the arc after the circuit has once been made through the auxiliary fuse circuit.

In Fig. 2 I have provided a diagram of connections which illustrates the mode of operation of the switch shown in Fig. 1. The switch blade member is indicated at 104 and when it is closed it makes contact normally with the stationary contacts 53, leading directly to the third conductor 59. Upon opening movement, the switch member 104 is first sufficiently moved from the stationary contact 53 to tend to destroy reformation of an arc between said members 104 and 53 and then the switch member 104 is brought into contact with the auxiliary contact 70 and through one of the fuses 89, 90 or 91, as determined by the selector member 94.

Obviously a single fuse may be employed and after each operation of the switch the fuse may be changed. I have illustrated the fuse magazine and the plurality of fuses merely to indicate that the operation of the switch is not dependent upon renewing the fuse for each operation of the switch.

Since the fuse has a high current interrupting capacity it will interrupt the flow of current quickly with very little arcing and it is, therefore, necessary to separate the main contacts a distance great enough to prevent immediate reformation of the arc, the opening of the switch of my invention being accompanied by very little arcing. The continued movement of the switch after switching in the fuse breaks the fuse circuit as well as the switch circuit itself, so that even if a fuse should fail to operate, the switch will properly open the circuit.

Since this is true, I may make the fuses of a capacity relatively great so that they will not be called upon to break the circuit unless the flow of current is of a character which would be difficult to break at the air contact. For example, the fuses may be set to blow at 100 amperes. Normal opening of the switch with normal load below 100 amperes would be easily performed by the switch operating as an air break switch. If the switch were opened on short circuit or excessive flow of current due to some other cause, in addition to the air break occurring at the main contact, the liquid quenched break in the fuse being in series with the main contact would assist in interrupting the flow of current even if the same were of a relatively high character.

The proper sequence of events may be secured by suitable spacing of the fuse contact 70 and the provision of suitable resistance and reactance in the fuse circuit. Since this is in circuit only so long as the fuse is subject to current flow, no appreciable loss will be occasioned by use of the same.

The fuse or fuses need not be mounted upon the switch structure, but may be placed at any position either adjacent or remote where it is convenient to replace them.

It will now be apparent that the switch of my invention is characterized by a normal metallic low resistance circuit and an abnormal or interrupting circuit, which comprises an automatic current interrupting device such as the carbon tetrachloride fuse in series with an air break mechanism, as is clear from the diagram of Fig. 2. These two interrupting elements, namely, the automatic liquid quenched fuse and the air break switch operate simultaneously and in series with each other, so that there is obtained the effect of multiple breaks, one of which breaks at least is, liquid quenched.

It will also be apparent to those skilled in the art that the relation of the movable and stationary contacts may be reversed, if desired. For example, in Fig. 2A, I have indicated a stationary contact 107 adapted to be engaged by a switch blade 106 which normally carries the current flow and which has attached to it an auxiliary blade 108 with an insulating section carrying a fuse 109, which may be of the same character as I have previously described, namely, a carbon tetrachloride fuse.

The two blades 106 and 108 are in this case connected together so that when the blade 106 moves away from the contact 107 during normal opening of the switch, an arc may form between said contact 107 and the switch blade 106, but continued motion of the switch blade 106 carries the blade 108 into contact with the stationary contact 107, thereby extinguishing the arc between contact 107 and switch blade 106 and directing the current flow through the fuse 109, the blade 108 continuing in its motion to draw away from the contact 107, so that the two breaks, namely, the air break and the liquid quenched break are in series with each other as the switch opens.

As above explained, it is desirable that the switch after once starting to move to open position should continue with a relatively rapid motion, and to this end a spring recoil may be employed, for example, in the vertical operating rod by which one or more switches of the character shown in Fig. 1 are operated in unison as, for example, three switches in a three phase system, the rod may be formed in two sections 110 and 111 with a spring cage and catch member 112 mounted on the section 110, this cage having a circular shoulder 113 which is caught by a swinging pawl 114 fixed on a suitable abutment 115. The lower section of the rod has a spring controlled plunger 116 secured to the upper end thereof. Between the plunger 116 and the bottom of the cage 112 there is confined a compression spring 117 which normally holds the sections 110 and 111 of the operating rod together in unison. The plunger 116 has a trip member 118 projecting out through a slot in the case 112 and this trip finger 118 is adapted to engage a co-operating trip member 119 on the upper end of the pawl 114. As a result, the rod section 111 may be drawn down putting the spring 117 under compression while the rod section 110 to which the switch mechanism proper is connected remains stationary. This action is carried to a point where the spring is compressed almost to its limit and then the trip 118 engages the nose of the pawl at 119, throwing the pawl 114 out of engagement with the shoulder 113 and thereby releasing the upper rod section 110 to permit the recoil of the spring 117 to throw the switch to completely open position.

Obviously, a quick break mechanism of this character may be employed on each individual switch in the case of separate or individually operated switches, but where there are gang switches the quick throw mechanism should be connected in a common operating rod for operating all of the switches substantially simultaneously.

I shall now refer to the second embodiment of my invention in which the fuse and its contact instead of being stationary as shown in the diagram of Fig. 2 is relatively movable, as indicated in the diagram of Fig. 2A. In this case the switch is mounted upon a suitable base 120 through insulators 121 and 122, the insulator 121 having a hinge contact 123 mounted thereupon, this hinge contact having the main switch blade 125 pivoted thereupon. The insulator 122 bears the split contact 124 for engaging with the free end of the blade 125.

A pair of guiding and locking horns 126 are mounted adjacent the split contact 124 for guiding the main switch blade 125 into contact with its co-operating split contact 124.

The arcing contact 126, 126 has at each side, that is, at each horn, a shoulder member 127 which extends towards the hinge contact 123 for the purpose of holding the auxiliary or quick break blade 128, which is pivoted to the main blade 125.

The auxiliary or quick break blade 128 is hinged at its rear end on the screw 129 to the swinging loop 130 which is pivoted upon the main blade 125 adjacent its rear end. The auxiliary blade 128 is connected electrically to the main blade 125 by a flexible copper braided strap 131 and mechanically the two blades are connected together through the spring 132, one end of which is looped about the pin 133 upon each side of the arcing blade 128 and the central part of which spring extends over the top of the main blade 125, as indicated at 134, this part being held in a notch in the blade 125 by means of the screw 135 and there being helical coils as indicated at 136 upon each side of the main blade 125. The structure of the spring 132 permits pivoting of the arcing blade 128 about the screw 129 and also permits endwise motion of the blade 128, the loop 130 serving as a guide for the same. This endwise movement of the blade 129 is desirable when the switch is closed to permit the pin 137 to slide along the tapered edge of the catch or detent 127 and then to be projected under the shoulder of the same. The main blade 125 has an operating eye 138 pivoted on a cross pin 139, this operating eye having a hook extension 140 beyond the pivot 139 with a suitable notch 141 for engaging a pin 142 which is mounted crosswise in the arcing blade 128. A pair of stop pins 143 and 144 limit the motion of the eye and its connected hook member 140. A spring 145, which is coiled about the pin 139, normally urges the hook member 140 in a clockwise direction as viewed in Fig. 11, to cause the slot 141 to catch the pin 142.

The operation of the switch thus far described is as follows:—

Assuming that the switch is in closed position as viewed in Fig. 11, the main blade 125 is pivoted on the hinge contact 123 and is embraced by the split contact 124. This main blade also lies between the arcing and guiding horns 126. The arcing blade 128 has its pin 137 caught under the shoulder 127 and the forward end of this blade is engaged by a contact spring 146, this contact spring being riveted at its upper end, as indicated at 147, to the arcing horn 126 upon each side of the auxiliary blade 128. Since the auxiliary blade 128 is locked by the detent 127 and since the main blade is locked to the auxiliary blade 128 through the hook member 140 and pin 142, it will be seen that the switch is thereby locked in closed position.

If, now, the operator wishes to open the switch, the operating hook is inserted in the eye 138 and the eye is moved to the left as viewed in Fig. 11, thereby releasing the hook member 140 from the pin 142. Thereupon, the main blade 125 may be moved out of the split contact 124, as indicated in dotted lines in Fig. 11, the arcing blade or quick break blade 128 remaining in contact through the springs 146 and the arcing horns 126, because of the pin 137 which is still retained under the shoulder 127. Continued motion of the main blade withdraws the pin 137 from the shoulder 127 when the switch has moved to a position which is substantially open. It will be observed that the tendency of the spring 132 is to expand and keep the pin 137 under the shoulder 127.

Figure 12:
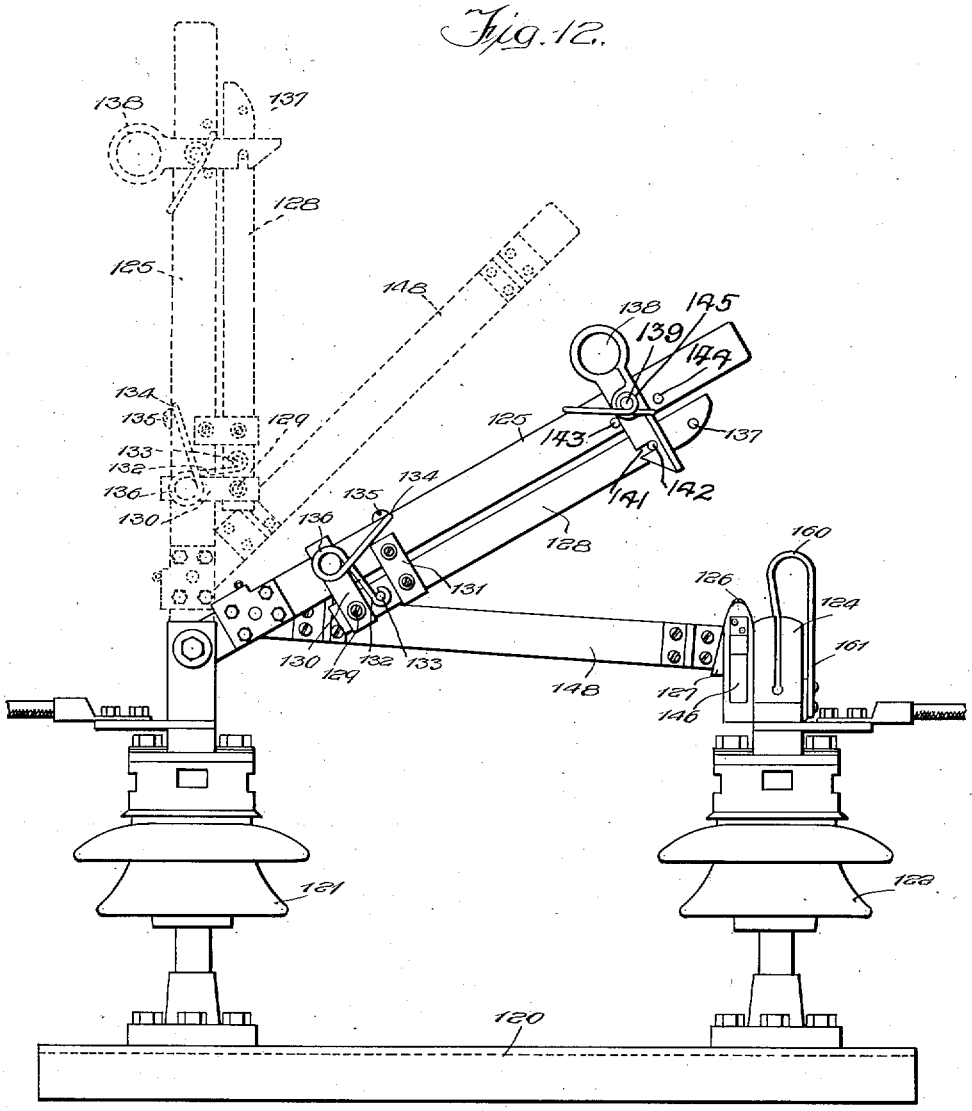
Fig. 12 is a like view of the same showing the switch in partly open position.

As soon as the pin leaves contact with the shoulder 127, the spring 132 swings the arcing blade 128 in a counter clockwise direction up into its normal position where the pin 142 is caught by the hook 140, as is illustrated in the dotted line position shown in Fig. 12.

The switch break mechanism which I have described is novel per se, and so is the lock which I have described. These mechanisms are combined, however, with the carbon tetrachloride fuse of the character previously described for the purpose of causing the actual break or the greater part thereof to occur within the fuse while the main parts of the switch are separating. In the present case an auxiliary fuse carrying blade 148 is hinged to the main blade 125, as will be clear from Fig. 13.

Figure 13:
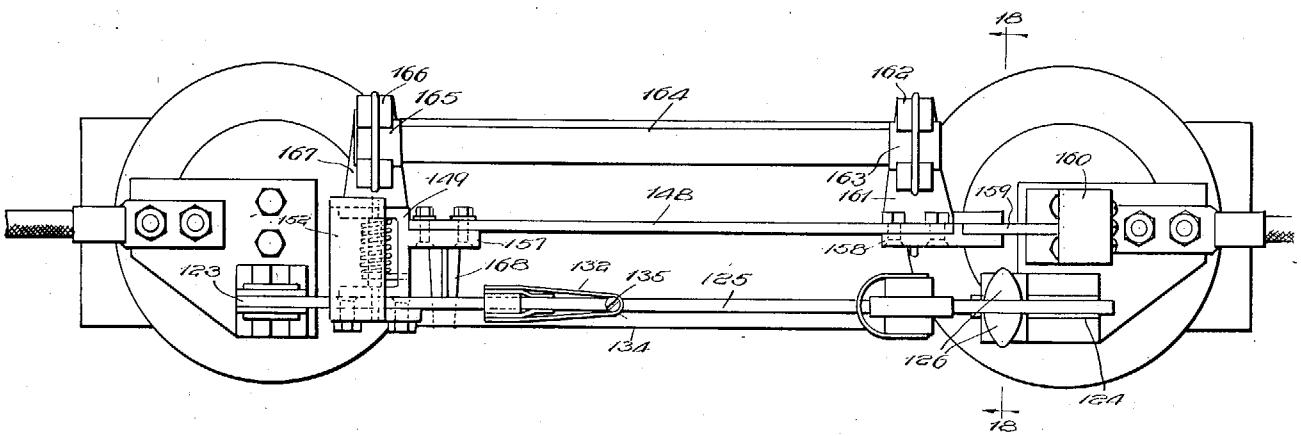
Fig. 13 is a top plan view of the switch.
Figure 17:
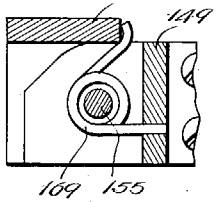
Fig. 17 is a fragmentary sectional view taken on the line 17—17 of Fig. 16.
Figure 16:
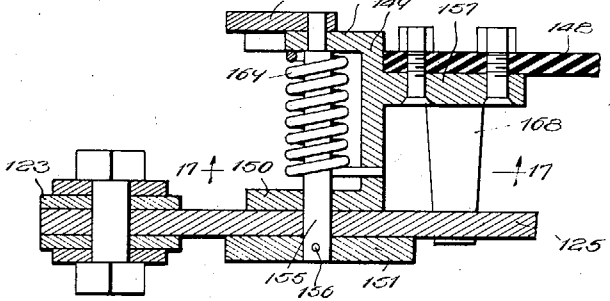
Fig. 16 is a cross sectional view taken through the horizontal axis of the rear end of the switch.

Referring to Figs. 13, 16 and 17, it will be seen that I have disposed adjacent one side of the main blade 125 the base or leg 150 of a bracket member 149, and upon the other side a plate 151 which is riveted to the blade. Plate 151 forms one leg of a U-shaped bracket shown at 152 in Fig. 13, the opposite leg 153 of which extends outside of the outer leg of the bracket 149. The bracket 149 has its other leg 154 adjacent the leg 153 of the bracket 152, so that said bracket 149 is confined between the blade 125 on one side and the opposite leg of the bracket 153 on the other, with the shaft or pivot pin 155 extending through all of these parts and being pinned, as indicated at 156, to the plate 151 of bracket 152. The bracket 149 has an extension 157 to which is bolted the fuse carrying blade 148, this blade being a strip of fibre or other suitable insulating material and having clamped at its forward end a bracket member 158 which has a forwardly extending contact member 159, preferably formed of a piece of rolled copper for extending the bracket 158 forward to engage the U shaped flat spring 160. The bracket member 158 in addition to being bolted to the insulating blade 148 has a laterally extending portion 161 which bears the fuse clip 162 for engaging the ferrule 163 of the fuse 164. The opposite ferrule 165 of the fuse 164 is mounted in a fuse clip 166 which in turn is mounted upon a laterally extending arm 167 integral with the bracket member 149.

Figure 14:
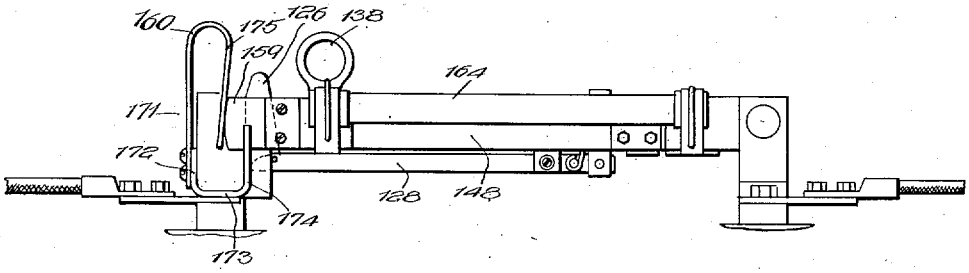
Fig. 14 is a rear side elevational view of the switch shown in Fig. 11.
Figure 15:
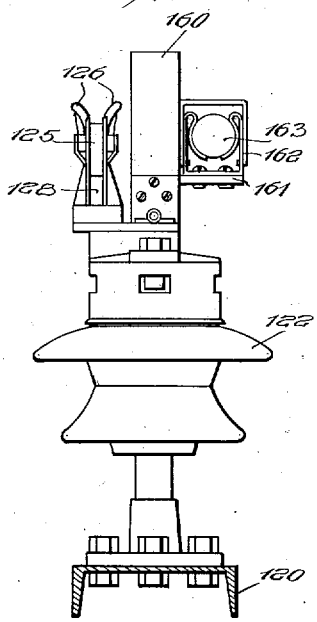
Fig. 15 is an end elevation of the switch as viewed from the left end of Fig. 14.
Figure 18:
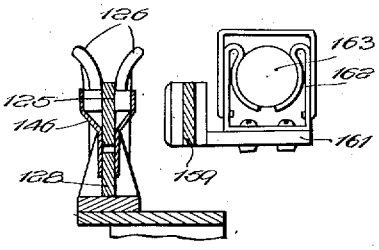
Fig. 18 is a section through the switch taken on line 18—18 of Fig. 13.

The extension 157 on the bracket 149 has an integral stop finger 168 reaching under the main switch blade 125, the hinge pin 155 having a helical spring 169 coiled about the same and having its ends anchored in the bracket members 152 and 149, respectively, tending to hold the auxiliary blade 148 away from the main blade 125, that is, tending to move the auxiliary blade 148 with its fuse 164 in a clockwise direction with respect to the main blade 125, as viewed in Fig. 11. The flat loop spring 160 is in electrical connection with the split contact 124 and connected to one side of the line. This spring 160 has its one side 171 connected to one side of the U shaped bracket 173, as shown in Fig. 14. The opposite side 174 serves as a stop for the free end of the spring 160. The latter arm 174 of bracket 173 is notched or slotted to receive the end of the contact member 159 and to hold the same against lateral displacement. The arm 175 of the spring 160 engages the end of the contact 159 and holds it in contact electrically and mechanically until the main blade with its arcing contact have been moved a sufficient distance to prevent re-establishment of the arc at the main contact after blowing of the fuse 164. The continued motion of the main switch blade then opens the auxiliary blade 148 with its fuse.

The operation of the switch will now be apparent. When the main blade 125 is opened, the arcing blade 128 lingers in contact with the arcing horns 126 and the spring 146 until the blade has reached a position where there is no danger of re-establishing the arc, whereupon the arcing or quick break blade 128 is snapped upwardly by the spring 132, throwing the fuse 164 into the circuit, and continued movement of the main blade causes the auxiliary blade 148 with its contact 159 to move away from the spring contact 160 to interpose a suitable space or air gap between the two parts of the switch.

The side members 150 and 154 of the bracket member 149, which support the auxiliary blade 148, are so arranged with respect to the bracket member 152 that after the main blade has reached a predetermined open position the auxiliary blade 148 will be moved with said main blade as though the two were rigidly connected together.

It is to be noted that the brackets 161 and 167 set the fuse 164 off to one side where the blowing of the fuse out of the end of the ferrule 163 will not affect the contacts 159 and 160, nor the main contacts 124 and 125.

If the switch is closed under load which may be sufficient to blow the fuse, the fuse is not inserted in its mounting on the auxiliary blade until after the switch is closed. If desired, a small ampere capacity fuse may be inserted on the mounting on the auxiliary blade when the switch is open, and employed as a test fuse to indicate that current will flow when the switch is closed. This is an important feature of the invention, particularly for installations where the switch is not to be closed under conditions where current will flow upon such closing. If the fuse blows it furnishes in such installations an indication that the switch should not be closed.

In the modification which I have above described, namely, where the fuse is mounted upon the auxiliary blade, the fuse is connected back in parallel with the main blade 125 upon closing of the switch, so that closing of the switch may be caused while the fuse is thus shunted and without danger of blowing the same.

It will be apparent from the foregoing that I have provided in both forms a pair of main contacts which normally carry the current and which are adapted to be separated for breaking the current flow, the first result of which is to switch in a fuse of high current interrupting capacity, the circuit through which is then broken by an air break secured by further opening movement of the main switch blade.

Figure 19:
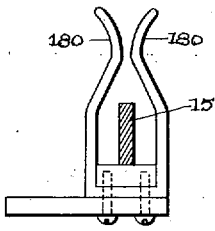
Fig. 19 is a fragmentary view of a contact for the switch bar bearing the fuse for use in a modified embodiment of the switch shown in Figs. 11 to 14, inclusive.

While in the constructions shown in Figs. 11 to 18 the fuse is thrown immediately into circuit when the arcing blade or quick break blade 128 opens, it will be apparent that the fuse contact 159 may be brought into engagement with the pair of opposed spring contact 180, shown in Fig. 19 which may replace spring 160 and bracket 173, after the quick break of the main blade has started to open the circuit.

Normally, in the switch shown in Fig. 11, the quick break releases when the main blade is substantially at 45° position towards its fully open position. This fuse blade begins to open substantially at the time that the quick break blade releases. The fuse blade travels with the main blade for substantially the rest of the movement of the main blade after about the first 45°.

I do not intend to be limited to the details shown and described.

I claim:—

1. The method of interrupting current flow through a switch having a relatively stationary and a relatively movable contact which comprises moving the movable contact from the stationary contact, connecting a fuse of high current interrupting capacity across the break between said contacts and thereafter continuing the movement of the movable contact to separate it further from the stationary contact and to disengage it from the fuse.

2. The method of interrupting current flow which comprises conducting the current flow through a pair of relatively separable contacts, separating said contacts to draw an arc, bridging the arc with a current interrupting device of relatively high interrupting capacity, then further separating said contacts and simultaneously disengaging said circuit interrupting means.

3. In combination, a pair of relatively movable switch contacts, a fuse having a fuse contact at one terminal and having the other terminal connected permanently to one of said switch contacts, means for separating said switch contacts by a relatively continuous movement, the separation of said switch contacts first throwing the fuse in circuit and then by continuous movement disconnecting the fuse contact.

4. In combination, a pair of switch contacts, means for separating said contacts over a definite path, a fuse connected permanently to one of said contacts and having a contact lying at a definite point of said path of separation to be engaged by and thereafter disconnected from one of said switch contacts.

5. In combination, a pair of relatively separable main switch contacts, means for separating said contacts by a substantially continuous movement, a fuse adapted to be connected across said contacts upon the separation thereof, and means for separating said fuse at one end from both of said contacts.

6. In combination, two switch contacts, a fuse having one end connected to one of the switch contacts, means to connect the other end of the fuse to the other switch contact when the switch starts to open, and means for moving one of said switch contacts relative to the other to open the switch and to cause the fuse to be disconnected.

7. In combination, a pair of switch contacts, means for moving one of the switch contacts relative to the other, a fuse adapted to be connected across said switch contacts when they start to open for interrupting the current flow, said movable switch contact being adapted to have motion to separate the contacts after the current flow is interrupted at said fuse.

8. In combination, a stationary switch contact, a movable switch contact, said movable switch contact having an arcing finger for taking the arc between the stationary contact and the movable switch contact when the switch is open, an auxiliary stationary contact adapted to be engaged by the arcing contact after the main contacts are open, and a fuse connected between the auxiliary contact and the main stationary contact, said arcing finger being moved away from the auxiliary contact by the opening movement of the switch.

9. In combination, a switch having a stationary contact member, a movable member having a co-operating movable contact, an arcing finger, and means for moving the movable member to a predetermined open position, an auxiliary contact adapted to be engaged by the arcing finger when the switch has moved to partially open position, and a fuse of high current interrupting capacity connected between the auxiliary contact and the main stationary contact.

10. In combination, a switch comprising a stationary contact member, a movable switch member having a contact and an arcing finger, an auxiliary contact and an upwardly extending horn connected thereto, said movable member being adapted to move to a predetermined open position so that the arcing finger and the movable member will form a co-operating horn for extinguishing an arc between said members, and an automatic liquid quenched circuit breaking member connected between the auxiliary contact and the main stationary contact.

11. In combination, a switch comprising a stationary contact, a movable contact, and an auxiliary stationary contact connected to the main stationary contact, and an automatic liquid quenched circuit breaker in said connection, said auxiliary contact being engaged by the movable contact after the same has moved when the movable contact is in a position sufficiently remote from the main stationary contact to prevent re-establishment of an arc therewith.

12. In combination, a stationary contact, a movable switch member normally engaging said stationary contact, means for moving the movable switch contact, a fuse, means for connecting the fuse between the movable switch contact and the stationary switch contact when the movable switch contact is in partly open position, and means for breaking the connection with the fuse when the main movable switch contact is moved further towards its open position.

13. In combination, a switch comprising a stationary contact, a movable contact, a plurality of fuses, an auxiliary contact adapted to be engaged by the movable contact when the switch is open, and means governed by operation of the switch for selectively connecting the fuses in circuit with said auxiliary contact.

14. In combination, a switch comprising a stationary contact member, a movable contact member, an auxiliary contact member, a plurality of fuses adapted to be connected between the auxiliary contact and the main stationary contact, means for selectively connecting said fuses, said means being governed by operation of the main switch.

15. In combination, a switch having a stationary contact member, a movable contact member, an auxiliary contact member, a plurality of fuses, and means controlled by operation of the movable switch member for connecting the fuses successively between the auxiliary contact member and one of said main switch members.

16. The method of interrupting the flow of a current through a pair of contacts which comprises separating the contacts, connecting a fuse of relatively high interrupting capacity in series in the circuit by continued separation of the contacts, and thereafter further separating the contacts and breaking the circuit through the fuse.

17. The method of interrupting the flow of a current through a pair of contacts which comprises separating the contacts, connecting a fuse of relatively high interrupting capacity in series in the circuit during continued separation of the contacts, and thereafter further separating the contacts and breaking the circuit through the fuse, the several steps mentioned taking place as a continuous operation.

18. The method of interrupting the flow of a current through a pair of contacts which comprises separating the contacts, connecting a fuse of relatively high interrupting capacity in series in the circuit during continued separation of the contacts, and thereafter further separating the contacts and breaking the circuit through the fuse, the several steps mentioned taking place as a continuous operation and there being relative movement between one of the contacts and the fuse for disconnecting the fuse from the circuit.

19. In combination, a switch contact, a fuse connected at one end of said contact, a fuse contact connected to the other end of the fuse, and, a second switch contact, there being relative movement between the contacts for opening and closing the switch contacts, said second contact upon opening thereof being moved successively out of operative relation to the first switch contact, into operative relation to the fuse contact to introduce the fuse into the circuit, and then out of operative relation to the fuse contact.

20. In combination, two switch contacts having relative movement; a fuse connected at one end to one of the contacts, and means for connecting the fuse in series in the circuit by the act of opening the contacts to a predetermined extent, the fuse being disconnected from the circuit by continued opening of the contacts.

21. The method of interrupting the flow of current through a pair of contacts which comprises, separating the contacts, connecting a means having a relatively high arc interrupting capacity in series in the circuit by continued separation of the contacts, and thereafter further separating the contacts to produce a gap between the contacts and said means.

22. The method of interrupting the flow of current through a pair of contacts which comprises, separating the contacts, connecting means having a relatively high arc interrupting capacity in series in the circuit by continued separation of the contacts, and thereafter further separating the contacts to produce a gap between the contacts and said means, the several steps mentioned taking place as a continuous operation.

23. The combination, in a circuit interrupter having main and auxiliary stationary and movable contact members, of a separate supported contact member adapted to engage the movable auxiliary contact member before the said movable auxiliary contact member comes into engagement with the stationary auxiliary contact member.

24. The combination, in a circuit interrupter having main and auxiliary stationary and movable contact members, of a separate supported contact member adapted to engage the movable auxiliary contact member before the said movable auxiliary contact member comes into engagement with the stationary auxiliary contact member during the switch closing movement, said separate contact member becoming disengaged from the movable contact member during the switch opening movement only after its disengagement from the stationary auxiliary contact member.

25. The combination, in a circuit interrupter having main and auxiliary stationary contact members, of a separate mounted stationary contact member, a main bridging member, and an auxiliary movable contact member that successively engages the mounted contact member and the stationary auxiliary contact member.

26. The method of interrupting current flow through a switch having a relatively stationary and a relatively movable contact, which comprises moving the movable contact from the stationary contact, connecting a current interrupting device of high interrupting capacity across the break between said contacts and thereafter continuing the movement of the movable contact to separate it further from the stationary contact and to disengage it from the device.

27. In combination, a pair of relatively movable switch contacts, an automatic current flow interrupting device having two terminals, one of which is connected permanently to one of the switch contacts and the other of which is a free terminal, disposed substantially in the path of movement of the other of said switch contacts, means for separating said switch contacts by a relatively continuous movement, the separation of said switch contacts bringing said device into circuit and then, by continuous movement, disconnecting said device at said latter terminal.

28. In combination, a pair of switch contacts, means for separating said contacts over a definite path, an automatic current interrupting device of high interrupting capacity connected permanently to one of said contacts and having a contact lying at a definite point of said path of separation to be engaged by and thereafter disconnected from one of said switch contacts.

29. The method of interrupting the flow of current through a pair of contacts, which comprises separating the contacts, connecting a current interrupting device of relatively high interrupting capacity in series in the circuit during the continued separation of the contacts, and thereafter further separating the contacts and breaking the circuit through the device, the several steps mentioned taking place as a continuous operation.

30. In combination, two switch contacts having relative movement, an automatic current flow extinguishing device connected at one end to one of the contacts, and means for connecting the device in series in the circuit by the act of opening the contact to a predetermined extent, the device being disconnected from the circuit by continuous opening of the contact.

31. A switching mechanism comprising a pair of circuit connections, three contacts for one of the circuit connections, said contacts comprising contacts 49, 48 and 70, an automatic current flow interrupting device comprising a chamber in which an arc is adapted to be drawn, said chamber having arc extinguishing means of relatively high capacity, said device connecting contact 70 with the said one-circuit connection, movable means having two contacts, namely, contacts 35 and 47, associated with the other of said circuit connections, said movable contact 35 co-operating with contact 49 to constitute the main contacts of the switching mechanism, said contacts 35 and 49 being arranged to close last and open first in the operation of the mechanism, contact 47 co-operating with contacts 48 and 70 in succession upon the opening of the main contact.

32. In combination, a main stationary contact, a first auxiliary stationary contact, a second auxiliary stationary contact, an element of high current interrupting capacity adapted to be automatically operated by current flow therethrough connecting the second auxiliary contact with the main contact, a main movable contact adapted to cooperate with the main stationary contact, an auxiliary movable contact cooperating successively with the said first auxiliary stationary contact and then with the second auxiliary stationary contact, said auxiliary movable contact drawing an arc between itself and the first auxiliary contact and carrying the moving end of the arc to the second auxiliary stationary contact to connect the arc in parallel with said element and to connect the auxiliary movable contact in series with said element, said auxiliary movable contact being thereafter separated from the second auxiliary stationary contact.

33. The method of breaking current flow in an air break switch which comprises, separating in air a pair of switch contacts to draw an arc, shunting said arc with a current interrupting device of high interrupting capacity, connecting said device in series relation between said contacts while they are being separated, breaking the flow of current between said contacts in the said device and separating one of said contacts from said device.

34. The method of breaking current flow through a switch which comprises, conveying the flow of current to be interrupted through a pair of contacts, separating in air said contacts, permitting the current flow to form an arc, shunting the arc with a current interrupting device of high interrupting capacity, conducting the flow of current which forms the arc in series through the device, breaking in said device the flow of current between said contacts, and interposing a protective air gap between one of said contacts and said device to prevent reestablishment of an arc.

35. The method of interrupting current flow through a pair of switch contacts which comprises, separating the contacts while current flow continues, interposing in circuit between the contacts a current interrupting device of high current interrupting ability, interrupting the current flow in the said device, and interposing a protective air gap between one of the contacts and said device.

In witness whereof, I have hereunto subscribed my name this 26th day of April, 1929.

NICHOLAS J. CONRAD.